(No Model.)
W. H. BENDERE.
SURFACE SAW.
No. 579,417. Patented Mar. 23, 1897.
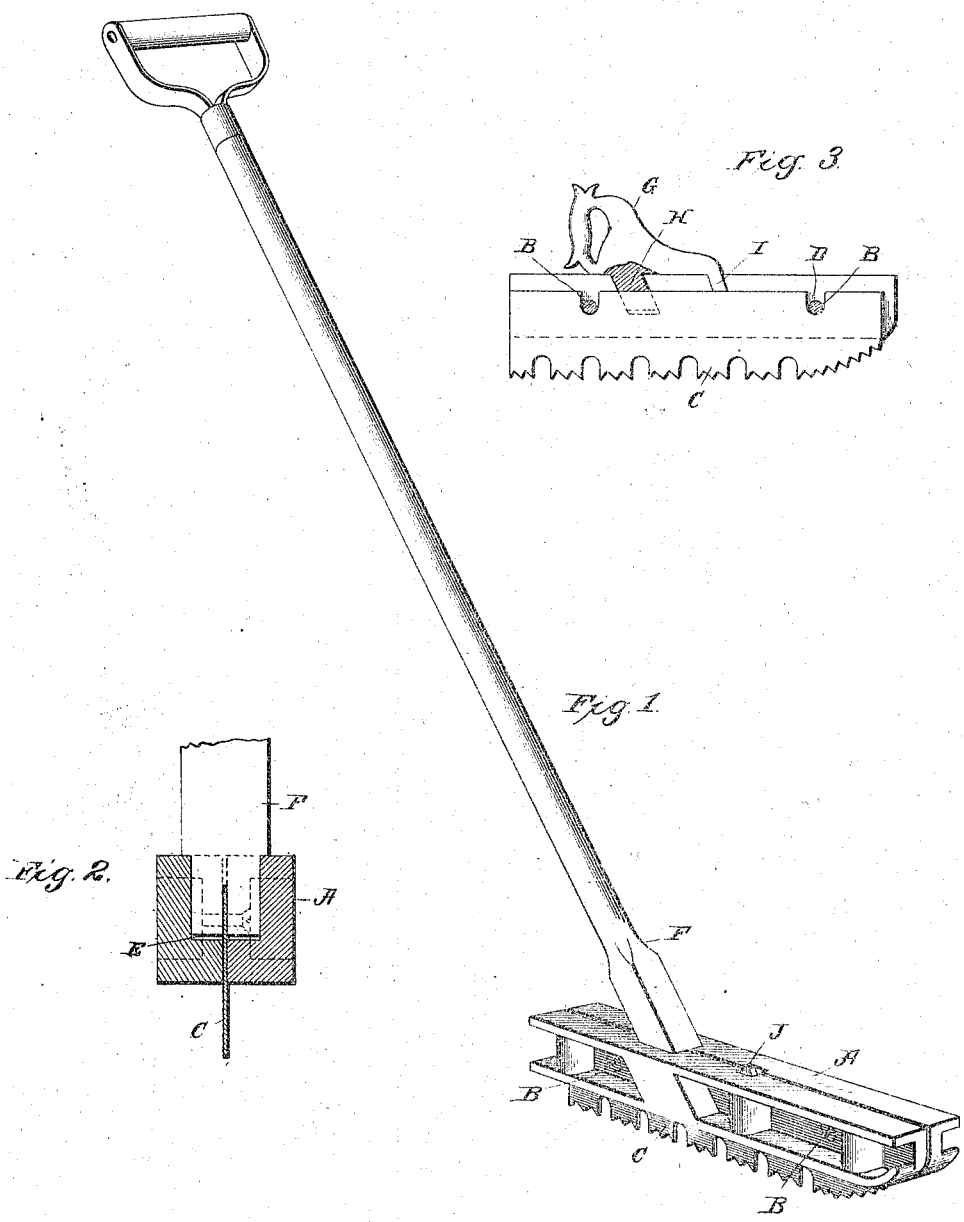

United States Patent Office.

WILLIAM H. BENDERE, OF PHILADELPHIA, PENNSYLVANIA.

SURFACE-SAW.

SPECIFICATION forming part of Letters Patent No. 579,417, dated March 23, 1897.

Application filed October 21, 1896. Serial No. 609,519. (No model.)

*To all whom it may concern:*

Be it known that I, WILLIAM HENRY BENDERE, a citizen of the United States, residing at Philadelphia, in the county of Philadelphia and State of Pennsylvania, have invented a certain new and useful Improvement in Surface-Saws, of which the following is a specification.

My invention relates to a new and useful improvement in surface-saws, and has for its object to provide a simple, cheap, and effective device by means of which a floor or other object presenting a plane surface and in which an edge is not presented may be sawed for the purpose of cutting out a portion thereof. Heretofore much inconvenience and loss of time have been occasioned in cutting out portions of a floor when it became necessary to gain access to the under side thereof for the running of pipes, as is often the case in building, since it is necessary by the old method to first bore several holes with an auger, unite the same by chiseling, and finally insert the saw through this slot in order to gain access to an edge, which is necessary in the use of an ordinary saw, whereas by my improvement these disadvantages are overcome and a portion of a floor may be quickly cut therefrom by the operation of my improved saw in a straight line after the manner of a plane.

In order that those skilled in the art to which this invention appertains may understand how to make and use the same, its construction and operation will now be described in detail, referring to the accompanying drawings, forming a part of this specification, in which—

Figure 1 is a perspective of my improvement, having adapted thereto a handle of sufficient length to permit the operator to stand erect when operating the saw; Fig. 2, a cross-section of the saw-head; and Fig. 3, a central longitudinal section of the head, showing a plane-handle attached thereto.

In carrying out my invention as here embodied I provide a head A, which is composed of two sections similar in design and adapted to be secured together by the screws B, and between these sections is clamped the saw-blade C, the upper edge of which is notched, as indicated at D, for embracing the shanks of the screws, so that the blade may be adjusted vertically to cause it to be true, more or less, from the under side of the head. A socket E is formed in the head for the insertion of the lower end of the handle F, and this end of the handle is preferably split, in order that it may embrace the upper edge of the saw when in place.

Now when the saw is to be used as before described the handle is grasped and the teeth of the saw placed upon the line to be operated upon, when by moving it back and forth after the manner of a plane a groove will be cut, and when this operation is continued said groove will be passed through the floor, and by repeating the operation parallel with the first groove formed a section of any length and width may be cut from the floor for the purpose of running pipe or gaining access thereto for repairs.

I have shown the saw made after the general pattern of a crosscut-saw, since its operations are similar thereto, and it has been found by practice that such shaped teeth are well adapted for the work, in that they not only cut their way in the material acted upon, but free the cut from sawdust. It sometimes is desirable to utilize a saw of this description upon a board or surface where it is not desired to cut the entire board or surface in two, and therefore no edge is presented for the starting of the saw, in which case I provide a handle G of the same general shape as that used in connection with ordinary planes, and this handle has formed upon the lower edge thereof a tenon H, adapted to fit within the socket E, and also has formed thereon a dowel I in the head, which will firmly secure the handle in position when in use, as practically the only force exerted upon said handle is in a forward direction, and as both the dowel and tenon are upon a forward incline they will be forced more tightly into their respective bearings by the force exerted to operate the saw. Since the head is made in two sections and may be separated, or partly so, it is obvious that saws of different thicknesses may be inserted therein in substitution for those which have previously been used, either for the purpose of replacing a saw after becoming worn or broken or providing for a wider cut.

I am aware that slight modifications may be made in the design here shown without departing from the spirit of my invention, and I therefore do not wish to be limited to the exact construction.

Having thus fully described my invention, what I claim as new and useful is—

In a surface-saw, two sections similar in design and adapted to be clamped together by screws, said sections being curved upward at one end, a blade clamped between the sections, each of said sections having recesses formed on their inner faces, said recesses slanting downward toward the curved end and forming sockets, a handle having projections adapted to fit in said sockets, substantially as set forth.

In testimony whereof I have hereunto affixed my signature in the presence of two subscribing witnesses.

WILLIAM H. BENDERE.

Witnesses:
S. S. WILLIAMSON,
F. MATTNER.